United States Patent [19]

Carson

[11] Patent Number: 5,182,313
[45] Date of Patent: Jan. 26, 1993

[54] METHOD AND APPARATUS FOR FORMING ARTICLES MADE OF POLYURETHANE

[76] Inventor: Scott Carson, 22 Monte Vista Dr., Woodland, Calif. 95695

[21] Appl. No.: 819,103

[22] Filed: Jan. 9, 1992

[51] Int. Cl.$^5$ .............................................. C08G 18/14
[52] U.S. Cl. ................................. 521/155; 249/66.1; 249/117
[58] Field of Search ........................... 521/155; 249/66

[56] References Cited

U.S. PATENT DOCUMENTS

| | | | |
|---|---|---|---|
| 2,923,978 | 2/1960 | Corzine | 13/56 |
| 3,278,658 | 10/1966 | Immel | 264/51 |
| 3,776,683 | 12/1973 | Putzer et al. | 425/446 |
| 4,027,845 | 6/1977 | Putzer | 249/142 |
| 4,404,168 | 9/1983 | Baumberger | 422/119 |
| 4,451,583 | 5/1984 | Chesler | 521/49.5 |
| 4,601,864 | 7/1986 | Vreenegoor | 264/37 |

FOREIGN PATENT DOCUMENTS

| | | |
|---|---|---|
| 0023749 | 2/1981 | European Pat. Off. |
| 2022147 | 11/1991 | Fed. Rep. of Germany |
| 2050922A | 1/1981 | United Kingdom |

OTHER PUBLICATIONS

Burwell, J., *The "Bunmaster" a New Concept in Discrete Bun Production*, Society of Plastic Industry, Inc., Polyurethane Division, Proceedings of the 27th Annual Conference, pp. 129–146 (1981).

Volland, R., Lindsey, J. and Schuberth, W., *A Technical Update on MDI Based Molded Flexible Foams*, Society of Plastic Industry, Inc., Polyurethane Division, Proceedings of the 28th Annual Conference, pp. 86–91 (1984).

*Primary Examiner*—Maurice J. Welsh

[57] ABSTRACT

A method and apparatus for forming articles made of polyurethane. The apparatus includes a polyol weigh tank, an isocyanate weigh tank, an additive tank and a mix tank enclosed by a vent chamber. The vent chamber is in communication with inlet and outlet pipes to move air and fumes from the interior of the vent chamber past a filter. The apparatus further includes a containment vessel also having inlet and outlet pipes for movement of air and fumes. The containment vessel is in communication with a pump for creating a vacuum in the vessel to reduce pressure in the interior of the vessel in which a mold is placed. The method includes the steps of: creating a vacuum around a mixture of at least one polyol, at least one isocyanate and at least one additive, to lower the pressure on the mixture below atmospheric pressure as the mixture expands; allowing the mixture to expand; reducing the vacuum to increase the pressure on the mixture in proportion to any further expansion of the mixture caused by the generation of a blowing influence in the mixture; and returning the pressure to atmospheric pressure.

28 Claims, 3 Drawing Sheets

METHOD AND APPARATUS FOR FORMING ARTICLES MADE OF POLYURETHANE

BACKGROUND OF THE PRESENT INVENTION

The present invention is generally directed to an apparatus and a method for manufacturing articles of polyurethane foam. More particularly, the invention relates to an apparatus and a method for manufacturing relatively large polyurethane articles by varying the pressure in the mold in which the article is formed.

Polyurethane foam has been used for many years for cushioning, insulation and other applications. Polyurethane foam is usually manufactured at atmospheric pressure from polyester or polyether based polyols combined with isocyanates, such as toluenediisocyanate (TDI), polymethylene polyphenylisocyanate (MDI), or mixtures thereof, and additives to form a finished product ranging from a very flexible to a very rigid product. The cell structure of the foam can range from completely open to completely closed. Examples of open cell, flexible polyurethane foam technology are disclosed in U.S. Pat. No. 4,451,583.

Most expanded flexible polyurethane is currently produced by the continuous conveyor method for producing slabs or by molding articles in a noncontinuous process. The continuous conveyer method or "slabstock" method is used to process the majority, by weight, of flexible polyurethane foam in the world. In this method, the liquid chemicals are mixed together and poured on a carrier sheet of plastic or paper. The carrier sheet rests either on a conveyor flat floor with two vertical sides or on a conveyor with a round shape. As the chemicals proceed down the conveyor, they rise or expand in the form of closed cells. In the case of open cell foam, as the reacting chemicals reach full expansion, the cell walls open and flow into struts. These struts continue to solidify until an almost cured dry article is formed. At the end of the conveyor, a saw cuts off a length of the article. The article is then taken to a storage area for final curing, which usually takes about 24 hours. This process is continuous until the machine is stopped.

An alternative method for producing polyurethane articles is the molding method. In the molding method, the liquid chemicals are mixed and deposited in a mold, with or without a lid, and the chemicals expand to the shape of the mold. An example of a molding apparatus is disclosed in U.S. Pat. No. 4,404,168.

As is well known to those skilled in the art and explained in U.S. Pat. No. 4,601,864, the above manufacturing methods have the disadvantage of releasing undesirable gases such as isocyanate, chlorofluorocarbons, or chlorinated solvents. It is known that these gases are harmful to either worker health or the environment.

One method to solve the chlorofluorocarbon and chlorinated solvent emission problem is to use a vacuum in place of these chemicals as proposed in European Patent Application, Publication No. 0,023,749. However, to those skilled in the art, it is known that to be economically successful the polyurethane article must be relatively large in size and have substantially flat surfaces and substantially square edges, all of which are difficult to achieve using the method in European Patent Application, Publication No. 0,023,749.

The present invention solves this problem by using vacuum in a manner that produces a relatively large polyurethane article that has substantially flat surfaces and substantially square edges all of which allow for economical fabrication of the article. The present invention also solves the problem of worker health and isocyanate fume emission by enclosing the machine and capturing the isocyanate gas in charcoal filters.

SUMMARY OF THE INVENTION

The present invention is directed to a method and apparatus for forming articles made of polyurethane. The apparatus includes a polyol weigh tank, an isocyanate weigh tank, an additive tank and a mix tank enclosed by a vent chamber. The vent chamber is in communication with inlet and outlet pipes to move air and fumes from the interior of the vent chamber past a filter. The apparatus further includes a containment vessel also having inlet and outlet pipes for movement of air and fumes past a filter. The containment vessel is in communication with a pump for creating a vacuum in the vessel to reduce pressure in the interior of the vessel in which a mold is placed.

The method includes the steps of: creating a vacuum around a mixture of at least one polyol, at least one isocyanate and at least one additive, to lower the pressure on the mixture below atmospheric pressure as the mixture expands; allowing the mixture to expand; reducing the vacuum to increase the pressure on the mixture in proportion to any further expansion of the mixture caused by the generation of a blowing influence in the mixture; and returning the pressure to atmospheric pressure.

It is the primary object of the present invention to provide an apparatus and a method to form an article from polyurethane to maximum material use and save resources.

It is an important object of the present invention to provide an apparatus and a method to form an article from polyurethane having containment equipment that protects the environment.

Other objects and advantages of the invention will become apparent as the invention is described hereinafter in detail and with reference to the accompanying drawings.

DETAILED DESCRIPTION OF THE PREFERRED EMBODIMENTS

Figure 1:
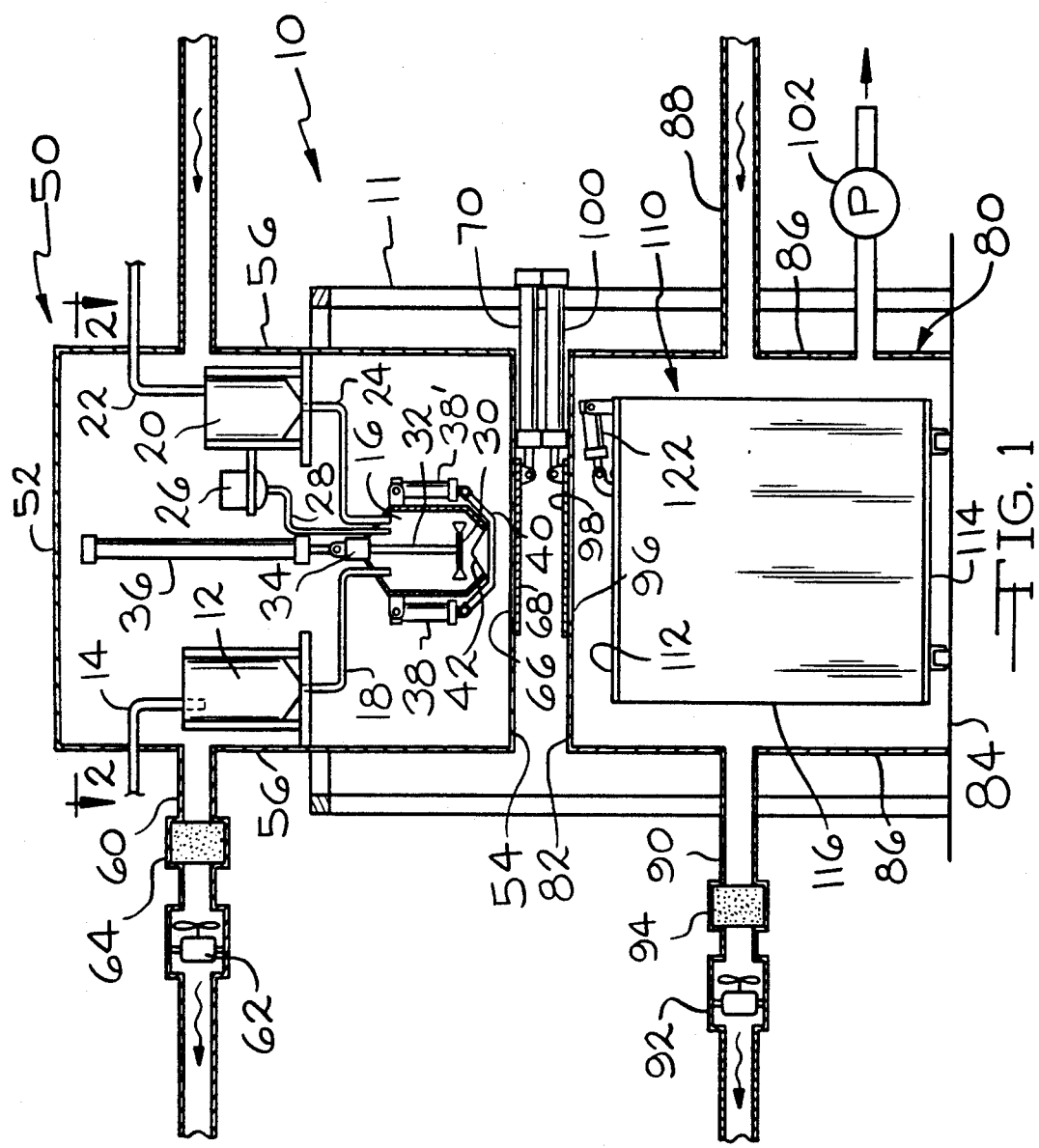
FIG. 1 is a side view of the apparatus of the present invention with the walls of the vent chamber and containment vessel partially cut away to show the mixing and pouring equipment and mold.
Figure 2:
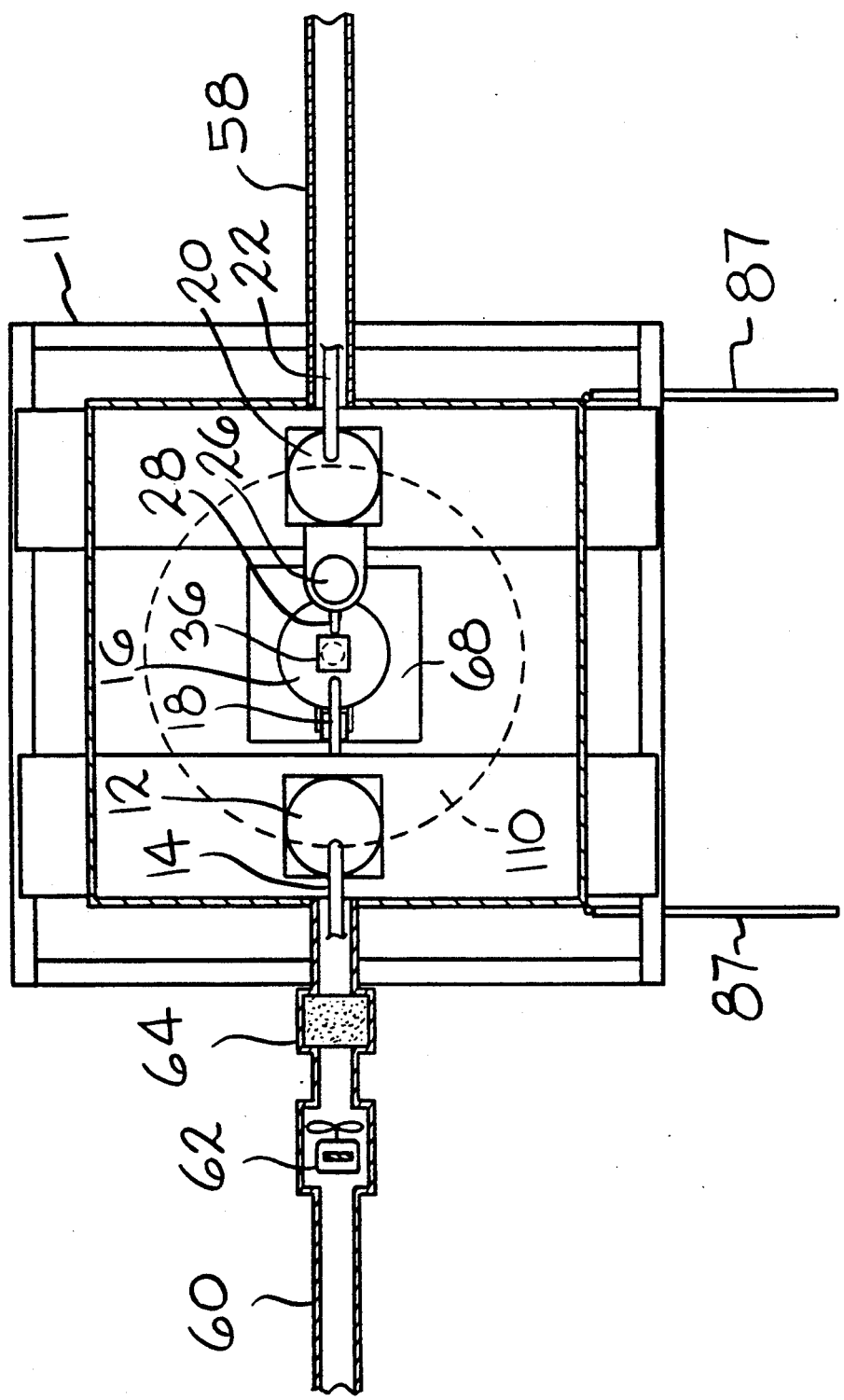
FIG. 2 is a top view of the apparatus taken along line 2—2 of FIG. 1.

Referring now to the drawings, and to FIGS. 1 and 2 in particular, the polyurethane molding apparatus of the present invention is identified by reference numeral 10. The apparatus 10 includes a frame 11 to provide support. The apparatus 10 further includes a polyol weigh tank 12. The tank 12 is connected to a polyol supply source (not shown) by a conduit 14. The tank 12 is connected to a mix tank 16 by a conduit 18.

An isocyanate weigh tank 20 is connected to an isocyanate supply source (not shown) by a conduit 22. The isocyanate weigh tank 20 is connected to the mix tank 16 by a conduit 24. An additive tank 26 is connected to the mix tank 16 by a conduit 28.

The mix tank 16 includes a high intensity rotor 30 connected to a shaft 32. The shaft 32 is connected to an electric motor 34 for turning the rotor 30. The mix tank is connected to an air cylinder 36 that allows the mix tank 16 to be raised and lowered. The mix tank 16 further includes mix tank cylinders 38 and 38' that open and close a mix tank door 40. The opening of the door 40 allows the contents of the mix tank 16 to exit the mix tank through a drain valve 42.

The mixing apparatus is enclosed by a vent chamber identified by the reference numeral 50. The vent chamber 50 includes an upper wall 52, a lower wall 54 and side walls 56. The vent chamber 50 is usually constructed of metal in the form of a square or rectangular box. However, the vent chamber 50 can be any geometric shape.

Outside air is drawn into the vent chamber 50 through an inlet pipe 58. The air and toxic fumes emitted by the chemicals in the mixing apparatus are drawn into outlet pipe 60 by a fan 62. As the air and fumes pass through the outlet pipe 60, the air is cleaned of the toxic materials in the fumes by a charcoal filter 64. The air then exits the outlet pipe 60 into the atmosphere or into a storage vessel (not shown) for future use or treatment. The vent chamber 50 prevents the toxic fumes emitted from the chemicals from entering the atmosphere thereby protecting the environment and worker health.

The vent chamber 50 further includes an opening 66 in the lower wall 54 to allow for the raising and lowering of the mixing tank 16. The opening 66 is closed by a vent chamber door 68. The door 68 is operatively connected to vent chamber door cylinders 70 for opening and closing the door 68.

Still referring to FIGS. 1 and 2, a containment vessel identified by reference numeral 80 is shown. The containment vessel 80 includes an upper wall 82, a lower wall 84 and side walls 86. In place of a lower wall 84, the surface upon which the apparatus 10 rests may act as the lower wall. The containment vessel 80 further includes doors 87. The containment vessel 80 is usually constructed of metal in the form of a square or rectangular box. However, the containment vessel 80 can be any geometric shape. The containment vessel should be constructed to be able to withstand and maintain varying levels of pressure within the vessel.

The containment vessel 80 includes an air inlet pipe 88 and outlet pipe 90 with a fan 92 and a charcoal filter 94. The fan 92 acts to draw air and toxic fumes through the inlet pipe 88 and the interior of the containment vessel 80. The filter 94 acts to clean the air of toxic materials from the polyurethane forming process. The air from outlet pipe 90 can be vented to the atmosphere or placed into a storage vessel (not shown) for future use or treatment.

The upper wall 82 of the containment vessel 80 includes an opening 96 having a containment vessel door 98. The door 98 is opened and closed by containment vessel door cylinders 100.

Besides acting as an environmental protection device, the containment vessel 80 also acts as a vacuum chamber for the mold 110. The vacuum in the containment vessel 80 is created by a pump 102. The pressure can be varied in the vessel by opening or closing either of the pipes 88 and 90.

Figure 3:
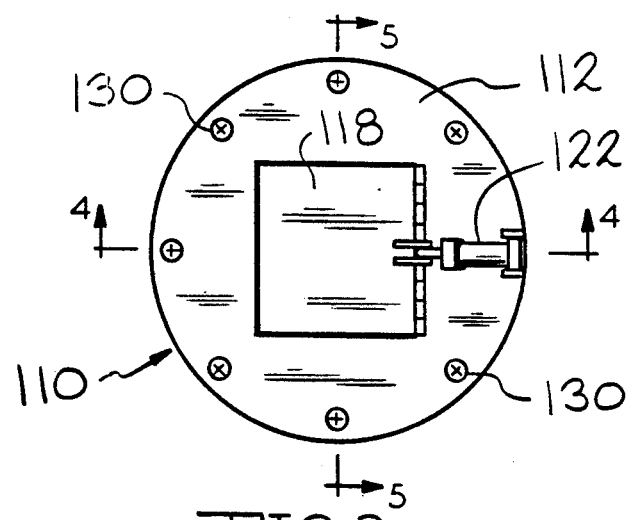
FIG. 3 is a top view of the mold.
Figure 4:
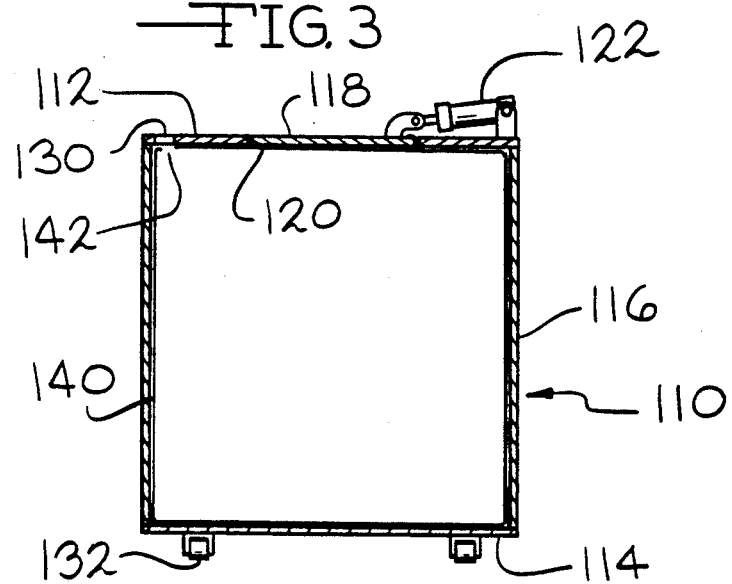
FIG. 4 is a side view of the mold taken along line 4—4 of FIG. 3.
Figure 5:
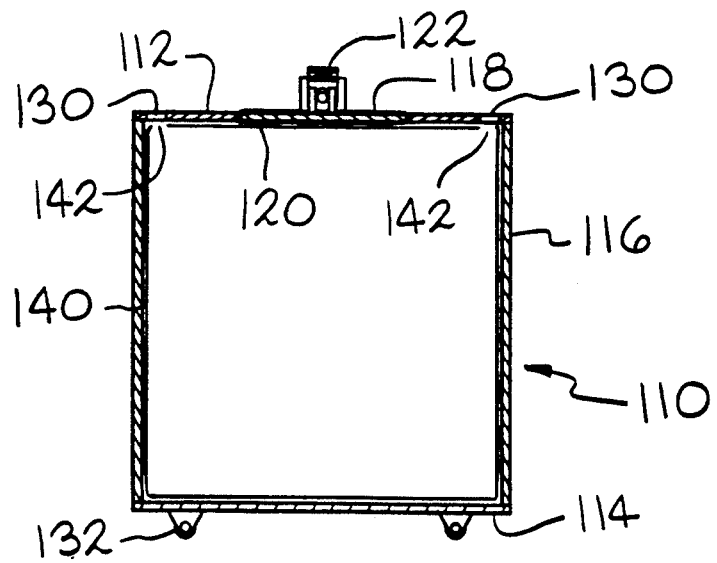
FIG. 5 is another side view of the mold taken along line 5—5 of FIG. 3.

Referring now to FIGS. 3-5, the mold 110 includes a top cover 112, a floor 114 and a removable body 116. In the present embodiment, the body 116 has a cylindrical configuration and is made of steel. However, it should be understood that the mold 110 can be any geometric shape and constructed from a variety of materials including metal or plastic. If a single mix tank 16 is used, as in the present embodiment, the mold 110 can be as large as about 2.25 m in diameter by about 2 m in height for a cylindrically shaped mold or about 2 in width by about 2 m in depth by about 2 m in height for a rectangularly shaped mold. The size of the molds are limited to these dimensions with a single mix tank. However, a plurality of mix tanks can be used to make articles larger than these dimensions. The mold 110 can be easily disassembled by removing the top cover 112 for access to the interior of the mold 110.

The top cover 112 includes a downwardly opening mold door 118 for opening and closing the mold opening 120. The mold door 118 is operatively connected to a mold door cylinder 122 for opening and closing the door 118. The mold door 118 allows for the entrance of the mix tank 16 into the mold 110. The mold door also prevents the movement of expanded foam through the mold opening 120. The top cover 112 further includes clearance holes 130 that are in communication with the interior of the mold 110. The holes 130 allow displaced air and fumes to exit the mold 110.

The floor 114 of mold 110 includes caster wheels 132. The wheels 132 allow the mold 110 to be moved in and out of the containment vessel 80 without lifting.

The mold 110 is lined with a flexible bag 140. The bag 140 can be made from a variety of materials with polyethylene, polypropylene, or polyvinyl chloride plastics being preferred. The bag 140 has a thickness of approximately 0.025 to 0.25 mm with 0.125 mm being preferred. The bag 140 includes slits 142 that are in communication with clearance holes 130. The slits 142 should be as narrow as possible to prevent the escape of expanded foam through the holes 130. The bag 140 lines the entire inner surface of the mold 110 with an opening in communication with mold opening 120. The bag 140 protects the mold from the foam and also allows for the quick removal of the molded article from the mold.

The sequence of operations of the apparatus 10 and the method steps of the present invention are as follows:

The fan 62 in outlet pipe 60 is energized. This allows for the fumes being emitted by the chemicals to be drawn past the filter 64. Fresh air is then allowed to enter the vent chamber 50 through inlet pipe 58. The polyol weight tank 12 is filled to formula weight from the polyol supply source (not shown) through conduit 14. The polyol is then gravity dumped into the mix tank 16 through a conduit 18. The polyol weigh tank 12 is then refilled with more polyol material. The term "polyol" is defined as a hydrogen donor. The polyol material has a molecular weight from about 250 to about 6000 and a functionality of from about 2 to about 8.

The isocyanate weigh tank 20 is filled to formula weight from an isocyanate supply source (not shown) through a conduit 22. The isocyanate material has a functionality of about 2.0 to about 2.8. At the time of production of the polyurethane foam, the correct weight of additives are charged into the additive tank 26. The term "additive" is defined as anything other than polyol or isocyanate that is added during the mixing process. Examples of additives include: water, surfactants, catalysts (tertiary amine and metallic), fillers, fire retardants and colorants.

The contents in the additive tank 26 are gravity fed into the mix tank 16 through a conduit 28 and blended into the polyol material, which is already in the mix tank 16, by the high intensity rotor 30. These contents of the mix tank 16 are first mixed by the rotor 30 for a period of 1 to 60 seconds, with 20 seconds being preferred. After the first mix cycle is completed, the isocyanate from the isocyanate weigh tank 20 is gravity dumped into the mix tank 16 through a conduit 24. The high intensity rotor 30 is immediately actuated for a second mix cycle of from 1 to 25 seconds, with 15 seconds being preferred.

During the second mix cycle, the mix tank 16 and its contents are lowered by air cylinder 36 into the interior of mold 110 through vent chamber opening 66, containment vessel opening 96 and mold opening 120. The mix tank 16 is lowered until it is approximately 7.5 cm above the floor 114 of the mold 110.

At the time the mix tank 16 is lowered through containment vessel opening 96 the fan 92 in outlet pipe 90 is energized. This allows for the fumes being emitted by the chemicals to be drawn past the filter 94. Fresh air is then allowed to enter the vessel through inlet pipe 88.

Upon completion of the second mix cycle, the drain valve 42 of the mix tank 16 is opened by mix tank door 40. The contents of the mix tank 16 are emptied into the bag 140 in the mold 110 in 1 to 10 seconds, with 3 seconds being preferred. The drain valve 42 is then closed and the mix tank is raised, in about 5 seconds, to its upper or starting position where the polyol in the polyol weight tank 12 is dumped into mix tank 16 and mixed by the rotor 30 to dilute reacting chemical remaining in the mix tank.

When the mix tank 16 clears the mold opening 120, the mold door 118 is closed. When the mix tank 16 clears the containment vessel opening 96, the containment vessel door 98 is closed to seal the upper wall 82 of the containment vessel 80. The fan 92 is de-energized and inlet pipe 88 and outlet pipe 90 are also sealed to allow the interior of the containment vessel 80 to be properly controlled. A vacuum is created in the containment vessel 80 by the use of a pump 102. During the forming process, the pressure around the mold is from about 7 kilo Pascal (k Pa) (absolute) to about 95 k Pa (absolute) pressure. Standard atmospheric pressure is 101.325 k Pa (absolute). The temperature in the vessel 80 is maintained at a temperature of from about 10° C. to about 30° C., with 21° C. being preferred.

The vacuum created in the containment vessel 80 lowers the pressure around the mold 110 and the chemical mixture in the mold. The vacuum causes the reacting chemicals to rise at a faster than normal rate. By the time the chemicals reach the top cover 112 of the mold 110, they are "younger" and more flowable than they would be in a conventional process at atmospheric pressure. This allows the rising younger foam to flow easily into the top edges of the mold 110, which the foam will not do in a conventional process at atmospheric pressure. The lower pressure created by the vacuum in the containment vessel 80 helps to draw the air from the bag 140 in the mold 110. The expanding chemicals are then able to fill all of the voids in the mold bag.

As described in detail in the following examples, at the time the mold bag 140 is completely full, the vacuum is reduced, and the pressure on the mixture is thereby increased, in proportion to any further expansion of the mixture caused by the generation of carbon dioxide or other blowing influences in the mixture. This proportional change of pressure in the mold 110 results in the closed cells remaining a constant size wherein the volume of foam in the mold remains constant. At the time of cell opening, in the case of open cell foam, the vessel pressure will be at atmospheric pressure if the desired product density is equal to the product density that would be achieved from a reaction conducted at atmospheric pressure. If a lower density product is desired, fewer chemicals would be charged into the mold, a vacuum would be applied such that the chemicals would reach the top when they were "young" and flow readily into the top corners of the mold, the vacuum would be reduced, and the vessel pressure at cell opening would be less than atmospheric pressure. The present invention by having young flowable chemicals fill the mold earlier than they normally would produces a relatively large article having a perfectly flat top, which is difficult to achieve using conventional molding methods. Further, the vacuum also allows for the foam to be expanded, without the use of blowing chemicals such as chlorofluorocarbons or chlorinated solvents which are harmful to the environment and worker health, to a lower density than is possible with only internally generated carbon dioxide.

During the molding process, the air displaced by the expanding foam and the fumes being emitted by the foam exit through the slits 142 in bag 140. The air and fumes then pass through vents 130 in the mold 110 and into the interior of the containment vessel 80. When the molding cycle is completed, inlet pipe 88 and outlet pipe 90 are opened and the fan 92 is energized. This allows for the air and fumes in the vessel 80 to be drawn past the filter 94. Fresh air is then allowed to enter the vessel through inlet pipe 88.

The mold 110 is removed from the containment vessel 80 though doors 87. The bag 140 containing the molded article is removed from the mold 110 and cured in the bag for a period of time, usually not less than 24 hours. During the curing period, the bag 140 continues to prevent isocyanate fumes from entering the atmosphere and any moisture in the environment from entering the foam.

The present invention can produce urethane articles having core densities ranging from about 1.5 kg/m$^3$ to about 40 kg/m$^3$ and a water formulation of from about 0 to about 10 parts by weight per 100 parts by weight of polyol. Higher and lower levels of water can be used depending on desired physical characteristics such as firmness.

EXPERIMENTAL DATA

Test formulas, physical properties and experimental data are set forth below.

| TRIAL 1 | |
|---|---|
| Polyol A | 100 parts |
| Water | 4 parts |
| Amine catalyst | .25 parts |
| Silicone | 1.1 parts |
| Stannous octoate | .2 parts |
| Isocyanate 1 | 50 parts |
| TRIAL 2 | |
| Polyol A | 100 parts |
| Water | 7 parts |

|              | -continued |         |
|--------------|-----------|---------|
| Amine catalyst  |   | .3 parts |
| Silicone     |   | 1.5 parts |
| Stannous octoate |   | .5 parts |
| Isocyanate 1 |   | 80 parts |
|              | TRIAL 3 |         |
| Polyol B     |   | 100 parts |
| Surfactant   |   | 12 parts |
| Catalyst     |   | .2 parts |
| Isocyanate 2 |   | 88 parts |

Polyol A = 3000 molecular weight polyether triol with a functionality of about 3.1
Polyol B = 370 molecular weight polyester polyol with a functionality of about 2.3
Isocyanate 1 = toluene diisocyanate (TDI) with an 80–20 ratio of 2,4 and 2,6 isomers
Isocyanate 2 = polymethylene polyphenylisocyanate (MDI) with a free NCO group (nitrogen, carbon and oxygen) content of about 31.5% and a functionality of about 2.7
All of the parts listed in the above chemical formulas are parts by weight.

EXAMPLES

The following examples were all produced in a cylindrically shaped mold having a top cover and a floor that was 30.5 cm in diameter by 26.5 cm in height. The temperature of the mold was maintained at a constant 21° C.

The foam densities stated in the examples are core densities determined after the outer surface was removed from the molded article. The weights of the chemicals charged into the mold were sufficient to compensate for the high density of the removed outer surface and to compensate for the off-gassing that occurs during the chemical reaction.

EXAMPLE I

About 740 grams of the chemicals listed in the formula of Trial 1 were charged, at atmospheric pressure, into the mold. The above chemicals were mixed for about 15 seconds and then the pressure around the mold was reduced to about 62 k Pa (absolute) by a vacuum pump. At about 90 seconds from beginning of mixing, the foam had expanded and completely filled the mold due to the generation of carbon dioxide in the closed cells in the foam. Between 90 and 130 seconds from the beginning of mixing, additional carbon dioxide was being generated in the closed cells. To prevent overfilling of the mold, the pressure around the mold was increased at a rate to exactly off-set the blowing effects of the additional carbon dioxide. Thus, the foam exactly filled the mold. At approximately 130 seconds from the beginning of mixing, the cells opened and at this time the pressure around the mold had been increased to atmospheric pressure. At about 360 seconds from the beginning of mixing, the mold was opened and the product, encased in a plastic bag, was removed from the mold. The article was the exact shape of the mold. This produced an open cell flexible polyether article having a density of about 24 kg/m$^3$ from a 4.0 part water formula.

EXAMPLE II

About 520 grams of the chemicals listed in the formula of Trial 1 were charged at atmospheric pressure into the mold. The chemicals were mixed for about 15 seconds and then the pressure around the mold was reduced to about 44 k pa (absolute) by a vacuum pump. At about 70 seconds from the beginning of mixing, the foam completely filled the mold and the pressure around the mold was increased at a rate so the mold stayed exactly full. At about 150 seconds from the beginning of mixing, the cells opened and at this time the pressure around the mold was about 74 k Pa (absolute). At about 360 seconds from the beginning of mixing, the pressure around the mold was increased to atmospheric pressure and the product was removed from the mold. The resulting article was in the exact shape of the mold. This produced an open cell flexible polyether article with a density of about 16 kg/m$^3$ from a 4.0 part water formula. It should be noted that the mold pressure being lower than atmospheric pressure at the time of cell opening produces a lower density article than that of Example I with the formula of Trial I.

EXAMPLE III

About 300 grams of the chemicals listed in the formula of Trial 1 were charged, at atmospheric pressure, into the mold. The chemicals were mixed for about 15 seconds and then the pressure around the mold was reduced to about 33 k Pa (absolute) by a vacuum pump. At about 160 seconds from the beginning of mixing, the foam completely filled the mold. The pressure around the mold was then increased at a rate to keep the mold exactly full and when the cells opened at about 200 seconds from the beginning of mixing, the pressure around the mold was about 60 k Pa (absolute). At about 360 seconds from the beginning of mixing, the vacuum was reduced to atmospheric pressure and the article was removed from the mold. The product was the exact shape of the mold. This produced an open cell flexible polyether product with a density of about 8 kg/m$^3$ from a 4.0 part water formula.

EXAMPLE IV

About 520 grams of the chemicals listed in the formula of Trial 1, along with an additional 0.4 grams of stannous octoate, were charged at atmospheric pressure into the mold. The chemicals were mixed for about 15 seconds and then the pressure around the mold was reduced to about 44 k Pa (absolute) by a vacuum pump. At about 70 seconds from the beginning of mixing the mold completely filled and the pressure around the mold was increased at a rate to keep the mold exactly full. At about 150 seconds from the beginning of mixing, no more carbon dioxide was being produced by the chemical reaction and the cells had not opened because of the higher level of stannous octoate. At this time the pressure around the mold was about 74 k P (absolute) and was maintained for three hours to allow the chemicals to cure. The pressure around the mold was then increased to atmospheric pressure and the article was removed from the mold. This produced a closed cell flexible polyether article with a density of about 16 kg/m$^3$ from a 4.0 part water formula.

EXAMPLE V

About 350 grams of the chemicals listed in the formula of Trial 2 were charged, at atmospheric pressure, into the mold. The chemicals were mixed for about 15 seconds and then the pressure around the mold was reduced to about 37 k Pa (absolute). At about 90 seconds from the beginning of mixing the mold completely filled and the pressure around the mold was increased at a rate to keep the mold exactly full. When the cells opened at about 140 seconds from the beginning of mixing the pressure around the mold was about 71 k Pa (absolute). At about 360 seconds from the beginning of mixing the pressure around the mold was increased to atmospheric pressure and the article was removed from the mold. The article was the exact shape of the mold. This produced an open cell flexible polyether article with a density of about 10 kg/m$^3$ from a 7.0 part water formula.

EXAMPLE VI

About 950 grams of the chemicals listed in the formula of Trial 3 were charged, at atmospheric pressure, into the mold. The chemicals were mixed for about 60 seconds and the pressure around the mold was reduced to about 27 k Pa (absolute) by a vacuum pump. When the foam had expanded and filled the mold, the pressure around the mold had been gradually increased to about 40 k Pa (absolute) and held for 3 hours before opening the mold. The article when removed from the mold was the exact shape of the mold. This produced a closed cell rigid polyester article having a density of about 40 k/m$^3$ from a formula with no water and no auxiliary blowing chemicals.

The above detailed description of the present invention is given for explanatory purposes. It will be apparent to those skilled in the art that numerous changes and modifications can be made in the examples of the invention described above without departing from the scope of the invention. Accordingly, the whole of the foregoing description is to be construed in an illustrative and not a limitative sense, the scope of the invention being defined solely by the appended claims.

I claim:

1. An apparatus for manufacturing articles made of polyurethane having a polyol weight tank, an isocyanate weight tank and an additive tank each in communication with a mix tank for mixing chemicals from said tanks, said polyol weigh tank, said isocyanate weigh tank and said additive tank being enclosed by a vent chamber, said apparatus further having a containment vessel for enclosing a mold for forming such polyurethane article.

2. The apparatus according to claim 1, wherein said vent chamber includes an upper wall, a lower wall and side walls.

3. The apparatus according to claim 2, wherein said upper wall, said lower wall and said side walls are made of metal.

4. The apparatus according to claim 2, wherein said vent chamber is in communication with an inlet pipe and an outlet pipe.

5. The apparatus according to claim 4, wherein said outlet pipe includes a fan to draw air and fumes from the interior of said vent chamber through said outlet pipe.

6. The apparatus according to claim 5, wherein said outlet pipe further includes a filter to filter such fumes from such air.

7. The apparatus according to claim 2, wherein said lower wall provides an opening for the movement of said mix tank, said opening being closed by a door.

8. The apparatus according to claim 1, wherein said containment vessel includes an upper wall, a lower wall and side walls.

9. The apparatus according to claim 8, wherein said upper wall, said lower wall and said side walls are made of metal.

10. The apparatus according to claim 8, wherein said containment vessel is in communication with an inlet pipe and an outlet pipe.

11. The apparatus according to claim 10, wherein said outlet pipe includes a fan to draw air and fumes from the interior of said containment vessel through said outlet pipe.

12. The apparatus according to claim 11, wherein said outlet pipe further includes a filter to filter such fumes from such air.

13. The apparatus according to claim 8, wherein said upper wall provides an opening for the movement of said mix tank, said opening being closed by a door.

14. The apparatus according to claim 1 wherein said containment vessel is in communication with a pump for varying the pressure within said containment vessel.

15. The apparatus according to claim 1, wherein said mold includes a top cover, a floor and a body.

16. The apparatus according to claim 15, wherein said top cover, said floor and said body are make of metal.

17. The apparatus according to claim 16, wherein said top cover of said mold provides an opening for the movement of said mix tank, said opening being closed by a door.

18. The apparatus according to claim 16, wherein said top cover includes clearance holes in communication with the interior of said mold to allow for the movement of displaced air and fumes from such interior.

19. The apparatus according to claim 16, wherein said mold includes a plastic bag that lines the interior of said mold.

20. The apparatus according to claim 1, wherein said apparatus includes a plurality of mix tanks.

21. A method for manufacturing an article made from polyurethane, which comprises the steps of:
(a) creating a vacuum around a mixture of at least one polyol, at least one isocyanate and at least one additive, to lower the pressure on said mixture below atmospheric pressure as said mixture expands;
(b) allowing said mixture to expand;
(c) reducing said vacuum to increase the pressure on said mixture; and
(d) returning said pressure to atmospheric pressure.

22. The method of claim 21, wherein said polyol has a molecular weight from about 250 to about 6000 and a functionality of from about 2 to about 8.

23. The method of claim 21, wherein said isocyanate has a functionality of about 2.0 to about 2.8.

24. The method of claim 21, wherein said additive is selected from a group including water, surfactants, catalysts, fillers, fire retardants and colorants.

25. The method of claim 21, wherein said mixture is composed of 100 parts by weight of polyol, from about 0 to about 10 parts by weight water, from about 0.1 to about 5 parts by weight surfactant, from about 0.1 to about 2.5 parts by weight catalyst and from about 40 to about 300 parts by weight isocyanate.

26. The method of claim 21, wherein said pressure around said mixture is varied from about 7 k Pa (absolute) to about 95 k Pa (absolute).

27. The method of claim 21, wherein the temperature around said mixture is from about 10° C. to about 30° C.

28. The method of claim 21, wherein the density of the article is from about 1.5 kg/m$^3$ to about 40 kg/m$^3$.

* * * * *